United States Patent
Oyaizu

(10) Patent No.: US 9,624,336 B2
(45) Date of Patent: Apr. 18, 2017

(54) POLYURETHANE FOAM

(75) Inventor: Seiji Oyaizu, Aichi (JP)

(73) Assignees: INOAC CORPORATION, Aichi (JP); ROGERS INOAC CORPORATION, Tokyo (JP)

( * ) Notice: Subject to any disclaimer, the term of this patent is extended or adjusted under 35 U.S.C. 154(b) by 459 days.

(21) Appl. No.: 14/234,424

(22) PCT Filed: Jul. 23, 2012

(86) PCT No.: PCT/JP2012/068593
§ 371 (c)(1),
(2), (4) Date: Jan. 23, 2014

(87) PCT Pub. No.: WO2013/015245
PCT Pub. Date: Jan. 31, 2013

(65) Prior Publication Data
US 2014/0193631 A1    Jul. 10, 2014

(30) Foreign Application Priority Data
Jul. 25, 2011    (JP) .................................. 2011-161650

(51) Int. Cl.
*C08G 18/42* (2006.01)
*C08G 18/66* (2006.01)
(Continued)

(52) U.S. Cl.
CPC ..... *C08G 18/4244* (2013.01); *C08G 18/3206* (2013.01); *C08G 18/36* (2013.01);
(Continued)

(58) Field of Classification Search
None
See application file for complete search history.

(56) References Cited

U.S. PATENT DOCUMENTS

2005/0248102 A1    11/2005   Sato
2006/0025493 A1*   2/2006    Simpson ............ C08G 18/4837
                                                        521/155
(Continued)

FOREIGN PATENT DOCUMENTS

JP         05-001128 A        1/1993
JP         9-183826 A         7/1997
(Continued)

OTHER PUBLICATIONS

[NPL-1] Tagawa et al. (JP 2008-280447 A); Nov. 20, 2008, (JPP—English Translation).*
(Continued)

*Primary Examiner* — David Sample
*Assistant Examiner* — Donald M Flores, Jr.
(74) *Attorney, Agent, or Firm* — Sughrue Mion, PLLC

(57) ABSTRACT

The present invention relates to a polyurethane foam obtained from a polyurethane raw material containing polyol, isocyanate, a foam stabilizer, a catalyst and a foam-forming gas by a mechanical froth method, wherein the polyol contains a castor oil-based polyol having a viscosity at 25° C. of 2,000 mPa·s or less, and a polyether-based polyol, the castor oil-based polyol is contained in an amount of from 20 to 80 parts by weight per 100 parts by weight of the polyol, the polyether-based polyol is contained in an amount of from 20 to 80 parts by weight per 100 parts by weight of the polyol, the polyurethane foam has an apparent density of from 100 to 700 kg/m$^3$, and compressive residual strain at 100° C. of 20% or less, and the polyurethane foam can be preferably used as a sealing material in a neighboring region of a heat source.

8 Claims, 3 Drawing Sheets

(51) Int. Cl.
  *C08G 18/36* (2006.01)
  *C08G 18/40* (2006.01)
  *C08G 18/44* (2006.01)
  *C08J 9/12* (2006.01)
  *C08G 18/32* (2006.01)
  *C08J 9/02* (2006.01)
  *C08G 101/00* (2006.01)

(52) U.S. Cl.
  CPC ......... *C08G 18/4018* (2013.01); *C08G 18/44* (2013.01); *C08G 18/6629* (2013.01); *C08G 18/6696* (2013.01); *C08J 9/02* (2013.01); *C08J 9/122* (2013.01); *C08G 2101/0066* (2013.01); *C08J 2203/06* (2013.01); *C08J 2205/044* (2013.01); *C08J 2205/06* (2013.01); *C08J 2375/04* (2013.01)

(56) References Cited

U.S. PATENT DOCUMENTS

| | | |
|---|---|---|
| 2008/0206560 A1 | 8/2008 | Park et al. |
| 2010/0086708 A1 | 4/2010 | Jenkines et al. |

FOREIGN PATENT DOCUMENTS

| | | | | |
|---|---|---|---|---|
| JP | 2002-214895 A | | 7/2002 | |
| JP | 2005-227392 A | | 8/2005 | |
| JP | 2008208447 A | | 9/2008 | |
| JP | 2008-280447 A | | 11/2008 | |
| JP | 2008280447 A | * | 11/2008 | ............ C08G 18/32 |
| JP | 2010-53157 A | | 3/2010 | |
| TW | 200527085 A | | 8/2005 | |
| WO | 2008/073808 A1 | | 6/2008 | |
| WO | 2010/023885 A1 | | 3/2010 | |

OTHER PUBLICATIONS

Office Action dated Jun. 29, 2015, issued by the Taiwanese Patent Office in counterpart Taiwanese Patent Application No. 101126849.
Communication dated Nov. 24, 2015 issued by the Japanese Patent Office in counterpart Japanese Patent Application No. 2013-525716.
Communication issued on Aug. 6, 2015 by the Korean Intellectual Property Office in related Application No. 10-2014-7001896.
Search Report dated May 8, 2015, issued by the European Patent Office in counterpart European Application No. 12816858.0.
International Search Report (PCT/ISA/210), dated Nov. 6, 2012, issued by the International Searching Authority in counterpart International Patent Application No. PCT/JP2012/068593.
Written Opinion (PCT/ISA/237), dated Nov. 6, 2012, issued by the International Searching Authority in counterpart International Patent Application No. PCT/JP2012/068593.

* cited by examiner

POLYURETHANE FOAM

TECHNICAL FIELD

The present invention relates to a polyurethane foam.

BACKGROUND ART

Conventionally, a silicone foam or a rubber sponge is used as a sealing material around a heat source part, for example, around a battery of an electric vehicle or around an electron control part, or in a sealing portion of a solar cell.

However, a sealing material comprising a silicone foam was difficult to be formed so as to have a thickness less than 0.8 mm. For this reason, the sealing material comprising a silicone foam has large thickness, and could not be used in a region requiring a thin sealing material. Furthermore, raw material cost is high, and a product could not be provided at a low price.

On the other hand, a rubber sponge has large compressive residual strain, and therefore has low long-term sealing property. Additionally, there is a possibility that a gas containing sulfur, generated from a rubber sponge corrodes an electronic substrate.

Furthermore, it is proposed that a polyurethane foam obtained by a mechanical froth method is used as a sealing material (Patent Documents 1 and 2).

The mechanical froth method is that first of all, as a polyurethane raw material, a foam-forming gas is compressed and mixed with a raw material containing polyol, isocyanate, a foam stabilizer and a catalyst. The polyurethane raw material is discharged from an oaks mixer or a nozzle having a tapered tip to form a polyurethane foam. The gas for foam formation compressed until then expands when discharging the polyurethane raw material and forms bubbles, and polyol is reacted with isocyanate under such a state to cure the polyurethane raw material, thereby foaming a polyurethane foam.

The polyurethane foam produced by a mechanical froth method is formed into a thin sheet state suitable as a sealing material. The polyurethane foam itself is inexpensive than a silicone foam, and additionally has good compressive residual strain as compared with a rubber sponge.

However, environmental temperature at which the conventional polyurethane foam produced by a mechanical froth method can be used as a sealing material is from about 70 to 80° C., and compressive residual strain is large at a temperature higher than the temperature. For this reason, it was difficult to use the conventional polyurethane foam as a sealing material for a long period of time in a neighboring region of a heat source.

(1) A method of increasing intermolecular crosslinking density and (2) a method of using a compound having a functional group with high cohesive property, such as an ester group or a phenyl group, are known as a method for improving heat resistance of a polyurethane foam.

However, in the method of (1), when intermolecular crosslinking density is increased, hardness of a polyurethane foam becomes high, thereby decreasing tearing strength, and as a result, such a polyurethane foam is not suitable for use as a sealing material. On the other hand, in the method of (2), in many cases the compound having a functional group with high cohesive property, such as an ester group or a phenyl group, is solid or waxy at room temperature, and even if the compound is liquid at room temperature, many compounds are that raw materials thereof have high viscosity. For this reason, where the compound is added in a large amount to the polyurethane raw material, there is a possibility in a mechanical froth method that defects such as voids (also referred to as pinholes) are generated in the polyurethane foam. Furthermore, even in any of (1) and (2), the polyurethane foam obtained is likely to have high hardness, and as a result, such a polyurethane foam was not practical as a sealing material.

BACKGROUND ART DOCUMENT

Patent Document

Patent Document 1: JP-A-2002-214895
Patent Document 2: JP-A-2005-227392

SUMMARY OF INVENTION

Problem that Invention is to Solve

Accordingly, the present invention has an object to provide a polyurethane foam suitable as a sealing material in a neighboring region of a heat source, such as around a battery of an electric vehicle.

Means for Solving Problem

The polyurethane foam of the present invention that can solve the above problems is a polyurethane foam obtained from a polyurethane raw material containing polyol, isocyanate, a foam stabilizer, a catalyst and a foam-forming gas by a mechanical froth method, wherein the polyol contains a caster oil-based polyol having a viscosity at 25° C. of 2,000 mPa·s or less, and a polyether-based polyol, the castor oil-based polyol is contained in an amount of from 20 to 80 parts by weight per 100 parts by weight of the polyol, the polyether-based polyol is contained in an amount of from 20 to 80 parts by weight per 100 parts by weight of the polyol, and the urethane form has an apparent density of from 100 to 700 kg/m$^3$, and compressive residual strain at 100° C. of 20% or less.

The polyurethane foam according to the present invention is preferably that the polyol contains the polyether-based polyol in which an ethylene oxide ratio that is a proportion of an oxyethylene unit in polyoxyalkylene is 50 mol % or more, in an amount of from 20 to 80 parts by weight per 100 parts by weight of the polyol, and a total amount of the polyether-based polyol in which the ethylene oxide ratio is 50 mol % or more, and the castor oil-based polyol is from 50 to 100 parts by weight per 100 parts by weight of the polyol.

The polyurethane foam according to the present invention is preferably that the castor oil-based polyol is contained in an amount of from 40 to 70 parts by weight per 100 parts by weight of the polyol, and the polyether-based polyol in which the ethylene oxide ratio is 50 mol % or more is contained in an amount of from 30 to 60 parts by weight per 100 parts by weight of the polyol.

The urethane foam preferably has a thickness of from 0.1 to 15 mm.

The urethane foam preferably has 25% compressive load of from 0.02 to 0.40 MPa.

The urethane foam preferably has an average cell diameter of from 50 to 300 μm.

The urethane foam preferably has compressive residual strain at 100° C. of 10% or less.

The urethane foam preferably has compressive residual strain at 110° C. of 10% or less.

Effects of Invention

According to the polyurethane foam of the present invention, because compressive residual strain at 100° C. is 20% or less, compressive residual strain at high temperature is small. Therefore, the present invention can provide a polyurethane foam suitable as a sealing material in a neighboring region of a heat source.

Figure 4:
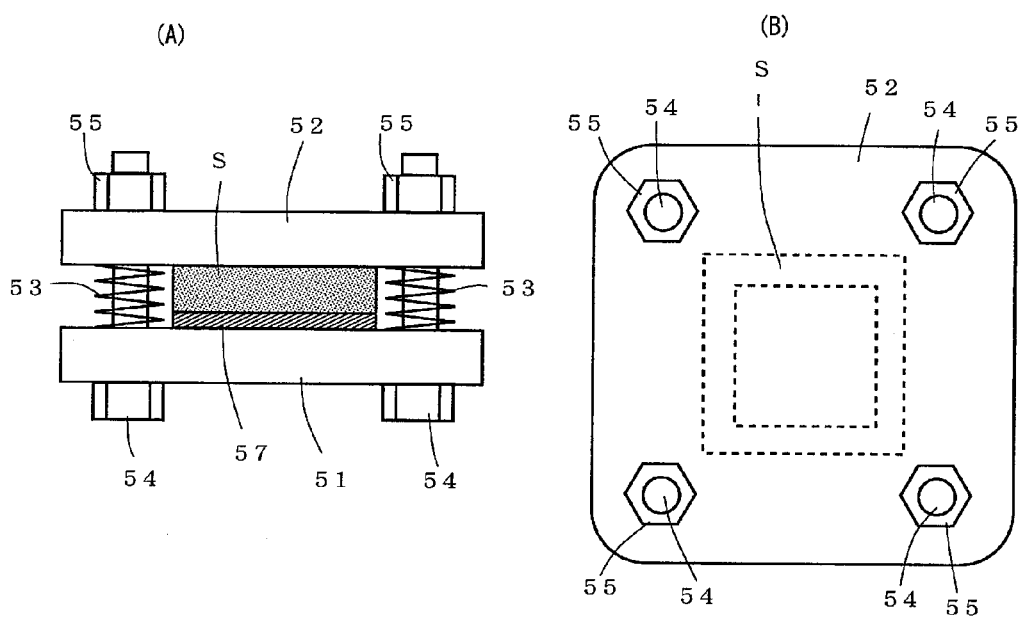

(A) of FIG. 4 is a side view showing the state when using a plate-like jig used in a dust resistance test, and (B) is a plain view thereof.

Figure 5:
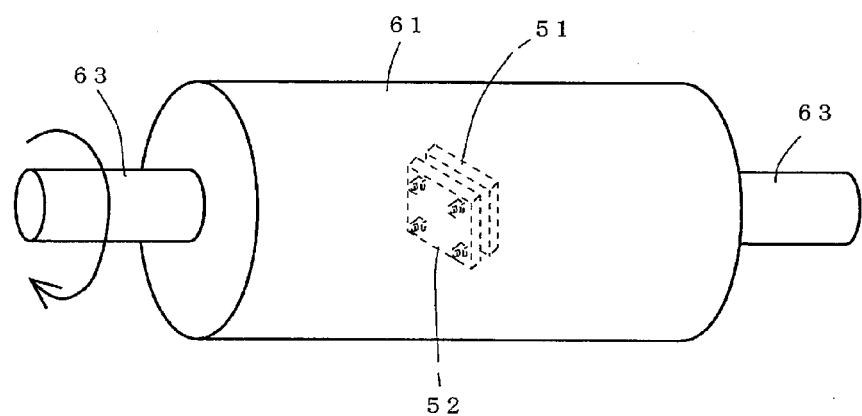

FIG. 5 is a perspective view of a cylindrical container used in a dust resistance test.

MODE FOR CARRYING OUT INVENTION

Figure 1:
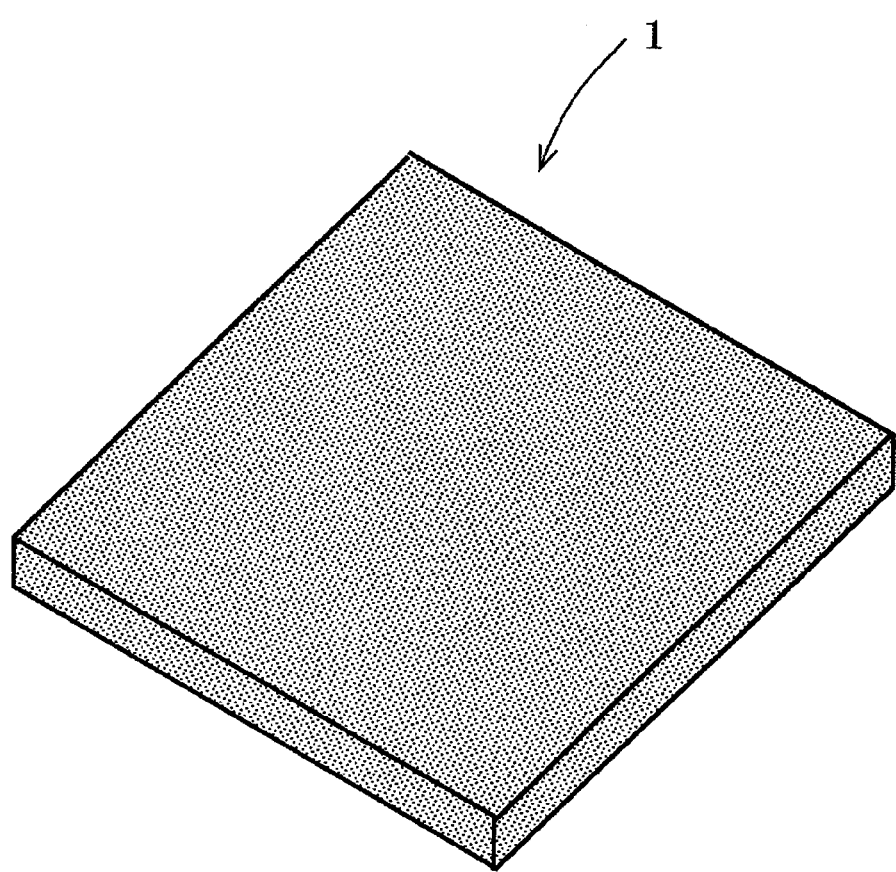
FIG. 1 is a perspective view of the polyurethane foam according to one embodiment of the present invention.

The embodiment of the present invention is described. A polyurethane foam 1 of the present invention shown in FIG. 1 is obtained from a polyurethane raw material by a mechanical froth method.

The polyurethane raw material contains polyol, isocyanate, a foam stabilizer, a catalyst and a foam-forming gas.

The polyol contains a castor oil-based polyol having a viscosity at 25° C. (according to JIS Z 8803: 2011) of 2,000 mPa·s or less, and a polyether-based polyol. The castor oil-based polyol is contained in an amount of from 20 to 80 parts by weight per 100 parts by weight of the polyol. The polyether-based polyol is contained in an amount of from 20 to 80 parts by weight per 100 parts by weight of the polyol.

Where a castor oil-based polyol having a viscosity at 25° C. higher than 2,000 mPa·s is used, the viscosity of the polyurethane raw material becomes too high, and the polyurethane raw material can not be mixed well. As a result, voids are generated in the polyurethane foam, and sealing property of the polyurethane foam is deteriorated.

In the case that the castor oil-based polyol is contained in an amount less than 20 parts by weight per 100 parts by weight of the polyol, compressive residual strain at 100° C. of the polyurethane foam can not be sufficiently decreased. On the other hand, in the case that the castor oil-based polyol is contained in an amount more than 80 parts by weight per 100 parts by weight of the polyol, the polyurethane foam becomes too hard even though the density of the polyurethane form is low, and compressive adhesiveness in the case of using as a sealing material is deteriorated.

The polyol contains the polyether-based polyol from the standpoint of improvement in hydrolysis resistance. Where the amount of the polyether-based polyol is less than 20 parts by weight per 100 parts by weight of the polyol, hydrolysis property is deteriorated, and compressive residual strain in high humidity can not be sufficiently decreased. On the other hand, where the polyether-based polyol is contained in an amount more than 80 parts by weight, the amount of the castor oil-based polyol is deficient, and compressive residual strain at 100° C. of the polyurethane foam can not be sufficiently decreased.

Examples of the castor oil-based polyol include a castor oil, a reaction product of a castor oil and polyol, and an esterified reaction product of a castor oil fatty acid and polyol. Examples of the polyol to be reacted with the castor oil or castor oil fatty acid include dihydric polyols such as ethylene glycol, diethylene glycol and propylene glycol, and trihydric or more polyols such as glycerin, trimethylolpropane, hexanetriol and sorbitol.

The castor oil-based polyol used has a viscosity at 25° C. (according to JIS Z 8803: 2011) of 2,000 mPa·s or less. The castor oil-based polyol more preferably has 2 to 3 functional groups, and a number average molecular weight of from 500 to 1,000 (or a hydroxyl value of from 115 to 225 mgKOH/g).

Examples of the polyether-based polyol that can be used include polyether polyols for polyurethane, such as polyether polyols obtained by adding alkylene oxide such as ethylene oxide or propylene oxide to polyhydric alcohol such as ethylene glycol, diethylene glycol, propylene glycol, dipropylene glycol, butylene glycol, neopentyl glycol, glycerin, pentaerythritol, trimethylolpropane, sorbitol or sucrose.

The polyether-based polyol preferably has 2 to 4 functional groups and a number average molecular weight of from 2,000 to 4,000. The polyether-based polyol is that an ethylene oxide proportion (hereinafter sometimes simply referred to as "EO ratio") that is a proportion of an oxyethylene unit in polyoxyalkylene is preferably 50 mol % or more, more preferably 60 mol % or more, and particularly 70 mol % or more. The upper limit of the ethylene oxide proportion is 100 mol % or less, and more preferably 90 mol % or less. When the ethylene oxide proportion is 50 mol % or more (more preferably 60 mol % or more, particularly 70 mol % or more), heat resistance of the polyurethane foam can be further improved. The polyether-based polyol may be used as mixtures of two kinds or more. In other words, it can say that the ethylene oxide proportion is a proportion of an ethylene oxide adduct in an alkylene oxide adduct. The heat resistance used herein means the degree that compressive residual strain in high temperature environment is difficult to be increased.

Particularly, the polyol is preferably that the polyether-based polyol having an ethylene oxide proportion of 50 mol % or more is contained in an amount of from 20 to 80 parts by weight per 100 parts by weight of the polyol, and the total amount of the polyether-based polyol having an ethylene oxide proportion of 50 mol % or more, and the castor oil-based polyol is from 50 to 100 parts by weight per 100 parts by weight of the polyol. Furthermore, it is preferred that the castor oil-based polyol is contained in an amount of from 40 to 70 parts by weight per 100 parts by weight of the polyol, and the polyether-based polyol having an ethylene oxide proportion of 50 mol % or more is contained in an amount of from 30 to 60 parts by weight per 100 parts by weight of the polyol. This can improve heat resistance of the polyurethane foam.

The polyol may contain a polycarbonate-based polyol, other than the castor oil-based polyol and polyether-based polyol.

Examples of the polycarbonate-based polyol includes products obtained by dealcoholization reaction between polyhydric alcohol such as ethylene glycol, diethylene glycol, propylene glycol, butanediol, pentanediol or hexanediol, and dialkyl carbonate, dialkylene carbonate or diphenyl carbonate.

The polycarbonate-based polyol is particularly preferably a polyol having a viscosity at 60° C. (according to JIS Z 8803: 2011) of 1,500 mPa·s or less among the polyols described above. Furthermore, the polycarbonate-based polyol more preferably has 2 to 3 functional groups and a number average molecular weight of from 500 to 1,000 (or a hydroxyl value of from 112 to 224 mgKOH/g).

The polyol may contain a polyester-based polyol, other than the castor oil-based polyol and polyether-based polyol.

Examples of the polyester-based polyol include products obtained by condensation between low molecular weight polyol such as ethylene glycol, diethylene glycol, propylene glycol, butanediol, hexanediol, glycerin, trimethylolpropane, trimethylolethane, pentaerythritol, diglycerin, sorbitol or sucrose, and succinic acid, adipic acid, maleic acid, fumaric acid, phthalic acid, isophthalic acid, succinic anhydride, maleic anhydride, phthalic anhydride or the like. Examples of the polyester-based polyol further include polyols that are a ring-opening condensate of caprolactone or methyl valerolactone, classified as lactone ester.

The isocyanate may be any of aromatic isocyanate, alicyclic isocyanate or aliphatic isocyanate, and may be bifunctional isocyanate having two isocyanate groups in one molecule, or trifunctional or more isocyanate having three or more isocyanate groups in one molecule. Those isocyanates may be used alone or as mixtures of two or more thereof.

Examples of the bifunctional isocyanate include aromatic isocyanate such as 2,4-tolylene diisocyanate (TDI), 2,6-tolylene diisocyanate (TDI), m-phenylene diisocyanate, p-phenylene diisocyanate, 4,4'-diphenylmethane diisocyanate (MDI), 2,4'-diphenylmethane diisocyanate (MDI), 2,2'-diphenylmethane diisocyanate (MDI), xylene diisocyanate, 3,3'-dimethyl-4,4'-biphenylene diisocyanate or 3,3'-dimethoxy-4,4'-biphenylene diisocyanate, alicyclic isocyanate such as cyclohexane-1,4-diisocyanate, isophorone diisocyanate, dicyclohexylmethane-4,4'-diisocyanate or methylcyclohexane diisocyanate, and aliphatic isocyanate such as butane-1,4-diisocyanate, hexamethylene diisocyanate, isopropylene diisocyanate, methylene diisocyanate or lysine isocyanate.

Examples of the trifunctional or more isocyanate include 1-methylbenzol-2,4,6-triisocyanate, 1,3,5-trimethylbenzol-2,4,6-triioscyanate, biphenyl-2,4,4'-triisocyanate, diphenylmethane-2,4,4'-triisocyanate, methyldiphenylmethane-4,6,4'-triisocyanate, 4,4'-dimethyldiphenylmetnane-2,2',5,5'-tetraisocyanate, triphenyl-methane-4,4',4''-triisocyanate and polymethylene polyphenyl isocyanate (polymeric MDI).

The isocyanate is not limited to one kind, respectively, and may be one kind or more. For example, one kind of aliphatic isocyanate and two kinds of aromatic isocyanate may be used in combination. Isocyanate index is preferably from 100 to 110. Where the isocyanate index is outside this range, compressive residual strain of the polyurethane foam is increased. The isocyanate index is a value obtained by centupling mole number of isocyanate group to one mole of active hydrogen group contained in a polyurethane raw material.

The foam stabilizer is preferably a nonionic surfactant such as polydimethylsiloxane or polyoxyalkylene. When the nonionic surfactant is used as the foam stabilizer, the foam-forming gas can form a foam structure suitable for a polyurethane foam. The amount of the foam stabilizer is preferably 3 to 8 parts by weight per 100 parts by weight of the polyol.

An amine-based catalyst for polyurethane foam and a metal catalyst (organometallic compound-based catalyst) are used alone or as a mixture thereof as the catalyst. Examples of the amine-based catalyst include a monoamine compound, a diamine compound, a triamine compound, a polyamine compound, a cyclic amine compound, an alcohol amine compound and an ether amine compound. Those may be used in one kind or as mixtures of two kinds or more. Examples of the metal catalyst include an organotin compound, an organobismuth compound, an organolead compound and an organozinc compound. Those may be used in one kind or two kinds or more. The amount of the catalyst is preferably from 0.05 to 0.5 parts by weight per 100 parts by weight of the polyol.

The foam-forming gas is preferably a gas that does not adversely affect a reaction between polyol and polyisocyanate, for example, dried air or an inert gas such as nitrogen. The foam-forming gas is preferably contained in a polyurethane raw material in an amount such that the mixing proportion in the polyurethane raw material is from 31 to 91 vol %. The mixing proportion of the foam-forming gas means vol % of a foam-forming gas to 100 parts by volume of the polyurethane raw material excluding the foam-forming gas.

As necessary, a crosslinking agent, a foaming aid, a filler and the like are added to the polyurethane raw material. Examples of the crosslinking agent include low molecular compounds having a number average molecular weight of from 50 to 800 that has 2 to 4 active hydrogen-containing groups reactive with an isocyanate group. Examples of the low molecular compound used as a crosslinking agent include ethylene glycol, diethylene glycol, propylene glycol, dipropylene glycol, 1,4-butanediol, 1,6-hexanediol, neopentyl glycol, glycerin, trimethylolpropane, triethanolamine and pentaerythritol. Those can be used in one kind or two kinds or more in combination. 1,4-Butanediol or ethylene glycol is particularly preferred as a crosslinking agent.

Where a crosslinking agent is not added, crosslinking density becomes low, resulting in decrease in heat resistance of a polyurethane foam. Therefore, the crosslinking agent is desirably added. Considering the balance to hardness, the amount of the crosslinking agent added is preferably from 5 to 15 parts by weight per 100 parts by weight of the polyol.

The foaming aid is added in the case of further decreasing an apparent density of a polyurethane foam, and a preferable foaming aid includes water. The amount of water added as a foaming aid is preferably from 0.4 to 2.5 parts by weight per 100 parts by weight of the polyol. Examples of the filler include a metal hydroxide as a viscosity regulator of a polyurethane raw material, a colorant and an antistatic agent.

The polyurethane foam of the present invention has compressive residual strain at 100° C. of 20% or less. The compressive residual strain is obtained by changing a temperature to 100° C. in JIS K 6400-4: 2004 Method A (70° C.) and performing 50% compression. The value is more preferably 10% or less at 100° C., and furthermore 20% or less at 110° C. and particularly 10% or less at 110° C. Thus, the polyurethane foam of the present invention is that compressive residual strain at relatively high temperature such as 100° C. or 110° C. is small. Therefore, the polyurethane foam can maintain good sealing property even at high temperature and can be preferably used as a sealing material in a neighboring region of a heat source.

Furthermore, the polyurethane foam of the present invention preferably has an apparent density of from 100 to 700 kg/m$^3$. The apparent density is a value measured based on JIS K 7222: 2005. When the apparent density falls within the range, the polyurethane foam can be made to have hardness suitable for a sealing material, and adhesiveness when using as a sealing material becomes good, thereby increasing sealing property.

The polyurethane foam of the present invention is preferably formed so as to have a thickness of from 0.1 to 15 mm. When the polyurethane foam has such a thickness, the polyurethane foam can be used as a sealing material used in a narrow space, and this is preferred.

The polyurethane foam of the present invention preferably has 25% compressive load of from 0.02 to 0.40 MPa. The 25% compressive load means compressive stress generated when performing 25% compression of a sample having a diameter of 50 mm in a rate of 1 mm/min under the test conditions of JIS K 6254: 1993. By this, elastic deformation of a polyurethane foam is improved, and in the case of using the polyurethane foam as a sealing material, adhesiveness when sealing becomes high.

The polyurethane foam of the present invention preferably has an average cell diameter of from 50 to 300 μm. The average cell diameter can be calculated as follows. Regarding cells directly contacting 25 mm line when a cross-section of a foam layer is observed by a scanning electron microscope at 200-fold magnification, cumulative total of cell diameters are divided by the number of cells. By this, sealing property of the polyurethane foam can be further improved.

The polyurethane foam of the present invention is produced by a mechanical froth method.

Figure 2:
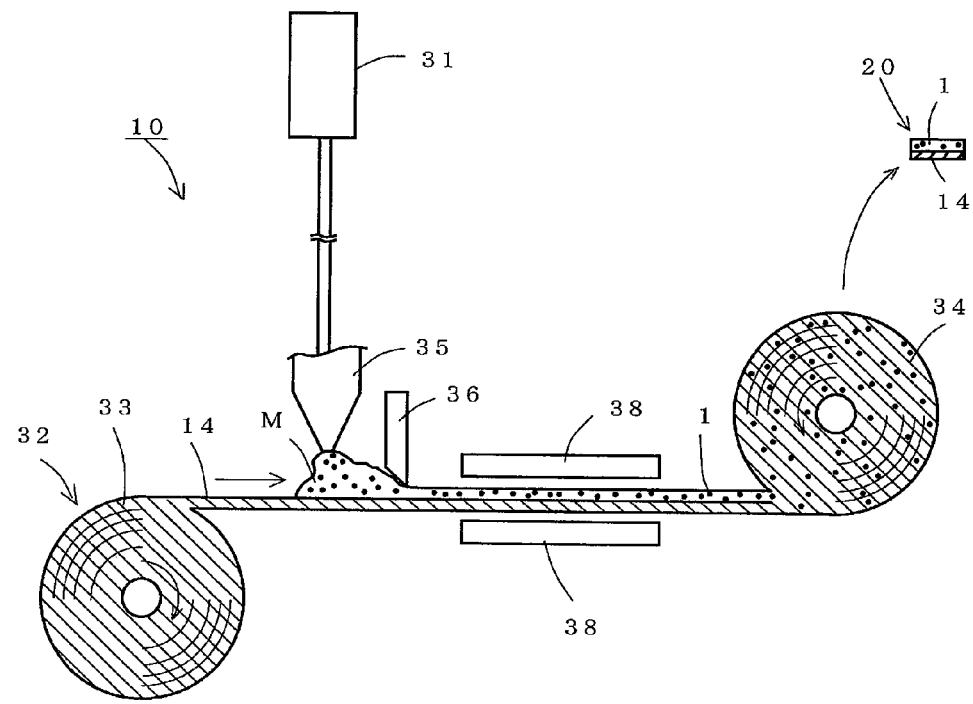
FIG. 2 is a view showing one example of a production apparatus of the polyurethane foam of the present invention.

A production apparatus 10 shown in FIG. 2 is one example of a production apparatus of the polyurethane foam of the present invention. The production apparatus 10 comprises a mixing part 31 for mixing raw materials to obtain a polyurethane raw material M, a roll mechanism 32 comprising a feed roll 33 having a substrate 14 wound thereon, for feeding the substrate 14 by a driving source not shown, and a product recovery roll 34, a discharge nozzle 35 for feeding the polyurethane raw material M on the substrate 14, a thickness control means 36 comprising a doctor knife or the like for controlling a thickness of the polyurethane raw material M on the substrate 14, and a heating means 38 such as a heater for heating the polyurethane raw material M on the substrate 14.

A method for producing a polyurethane foam by a mechanical froth method using the production apparatus 10 is that first the polyurethane raw material M mixed in the mixing part 31 is discharged on the substrate 14 comprising a PET film, a release paper or the like fed from the feed roll 33, from the discharge nozzle 35.

Next, the thickness of the polyurethane raw material M discharged on the substrate 14 is controlled to a given thickness using the thickness control means 36. Subsequently, the polyurethane raw material M is heated with the heating means 38 to react and cure the raw material M. A laminate 20 comprising the substrate 14 having formed thereon a polyurethane foam 1 is wound on the product recovery roll 34. Thereafter, the laminate 20 is cut into given dimension and shape, and the substrate 14 is peeled to obtain the target polyurethane foam 1.

In the example shown in the drawing, the product recovery roll 34 for recovering the laminate 20 is shown, but the present invention is not limited to this. For example, it may be constituted such that the polyurethane foam 1 and the substrate 14 are peeled from the laminate 20, the polyurethane foam 1 is recovered by a polyurethane foam recovery roll and the substrate 14 is recovered by a substrate recovery roll.

Figure 3:
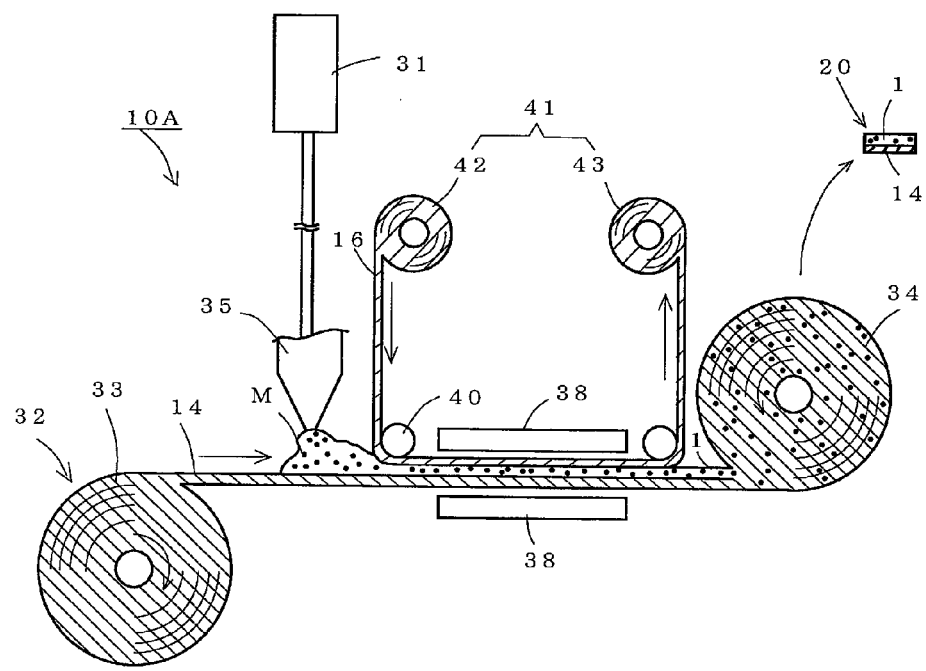
FIG. 3 is a view showing a production apparatus of other example.

Furthermore, it may be constituted as shown in FIG. 3. FIG. 3 shows a production apparatus 10A according to a modification example. The production apparatus 10A is provided with a surface protective mechanism 41 between the discharge nozzle 35 and the product recovery roll 34. The surface protective mechanism 41 comprises a surface protective film feed roll 42 and a surface protective film recovery roll 43. The surface protective film feed roll 42 feeds a surface protective film 16 such as a PET film by a driving source not shown. Reference numeral 40 is a thickness control means comprising a roll, and controls a thickness of the polyurethane raw material M between the substrate 14 and the surface protective film 16.

When the production apparatus 10A is used, the surface protective film 16 is laminated on the upper surface of the polyurethane raw material M fed on the substrate 14. This can produce a polyurethane foam in the state that the polyurethane raw material M is sandwiched between the substrate 14 and the surface protective film 16. Furthermore, the surface protective film 16 can be peeled and recovered from a laminate.

Modification example of the production apparatus 10A may constitute such that although not shown, a substrate recovery roll is provided at a lower side of the product recovery roll 34, the substrate 14 is peeled and recovered from the polyurethane foam 1, and only the polyurethane foam 1 is wound on the product recovery roll 34 to recover the same.

EXAMPLES

Polyurethane foam 1 of Examples 1 to 15 were produced from polyurethane raw materials M having the formulations shown in Tables 1 and 2 using the production apparatus 10 shown in FIG. 2. In this case, a PET film having a thickness of from 25 to 125 μm was used as the substrate 14, and the polyurethane raw material was heated to 120 to 200° C. by the heating means 38. Nitrogen as a foam-forming gas was fed to and mixed with the polyurethane raw material in the mixing part 31 in a flow rate of 0.1 NL/min so as to achieve a mixing proportion (vol %) in Tables 1 and 2. Feed rate of the substrate 14 in the roll mechanism 32 was 5 m/min.

For the sake of comparison, polyurethane foams of Comparative Examples 1 to 10 were obtained from polyurethane raw materials having the formulations shown in Table 3. Comparative Examples 1 to 7 were that polyurethane foams were produced in the same production method as in Examples 1 to 14 except that formulation of a polyurethane raw material differs. Comparative Examples 8 to 10 were that a foam-forming gas was not used, and polyurethane foams were obtained by discharging a polyurethane raw material having added thereto water as a foaming agent on a substrate comprising a PET film and heating the raw material to foam the same by a chemical foaming method.

(Raw Materials of Tables 1 to 3)

Castor oil-based polyol 1: manufactured by Itoh Oil Chemicals Co., Ltd., trade name "H-30", viscosity (25° C.): 690 mPa·s (viscosity (60° C.): 85 mPa·s), number of functional group: 2.7, number average molecular weight: 950 (hydroxyl value: 160 mgKOH/g)

Castor oil-based polyol 2: manufactured by Itoh Oil Chemicals Co., Ltd., trade name "AC-005", viscosity (25° C.): 1,150 mPa·s (viscosity (60° C.): 125 mPa·s), number of functional group: 2, number average molecular weight: 550 (hydroxyl value: 204 mgKOH/g)

Castor oil-based polyol 3: manufactured by Itoh Oil Chemicals Co., Ltd., trade name "AC-006", viscosity (25°

C.): 3,000 mPa·s (viscosity (60° C.): 200 mPa·s), number of functional group: 2, number average molecular weight: 630 (hydroxyl value: 178 mgKOH/g)

Polyether-based polyol A: manufactured by Sanyo Chemical Industries, Ltd., trade name "GP-3000", viscosity (25° C.): 500 mPa·s, number of functional groups: 3, number average molecular weight: 3,000, EU ratio: 0 mol %

Polyether-based polyol B: manufactured by Sanyo Chemical Industries, Ltd., trade name "FA-103", viscosity (25° C.): 730 mPa·s, number of functional groups: 3, number average molecular weight: 3,300, EU ratio: 70 mol %

Polyether-based polyol C: manufactured by Sanyo Chemical Industries, Ltd., trade name "GL-3000", viscosity (25° C.): 510 mPa·s, number of functional groups: 3, number average molecular weight: 3,000, EU ratio: 20 mol %

Polyester-based polyol: manufactured by Kuraray Co., Ltd., trade name "P-510", viscosity (25° C.): 540 mPa·s, number of functional groups: 2, number average molecular weight: 500 (hydroxyl value: 224 mgKOH/g)

Polycarbonate-based polyol 1: manufactured by Kuraray Co., Ltd., trade name "C-590", viscosity (60° C.): 170 mPa·s, number of functional groups: 2, number average molecular weight: 500 (hydroxyl value: 224 mgKOH/g)

Polycarbonate-based polyol 2: manufactured by Kuraray Co., Ltd., trade name "C-1090", viscosity (60° C.): 1,800 mPa·s, number of functional groups: 2, number average molecular weight: 1,000 (hydroxyl value: 112 mgKOH/g)

Crosslinking agent: 1,4-butanediol

Metal catalyst: manufactured by Johoku Chemical Co., Ltd., trade name "MRH110", tin octylate Foam stabilizer: manufactured by Momentive, trade name "L-5614", nonionic surfactant Metal hydroxide: manufactured by Showa Denko K.K., trade name "HIGILITE H-10", aluminum hydroxide Foam-forming gas: nitrogen Isocyanate: manufactured by Nippon Polyurethane Industry Co., Ltd., trade name "CORONATE 1130", NCO %: 31%, crude MDI

TABLE 1

|  |  | Example | | | | | | | | |
|---|---|---|---|---|---|---|---|---|---|---|
|  | Foaming method | 1 | 2 | 3 | 4 | 5 | 6 | 7 | 8 | 9 |
|  |  | | | | Mechanical froth method | | | | | |
| Polyurethane raw material | Castor oil-based polyol 1 (parts by weight) | 22 | 44 | 44 | 64 | 22 | 0 | 44 | 44 | 44 |
|  | Castor oil-based polyol 2 (parts by weight) | 0 | 0 | 0 | 0 | 0 | 44 | 0 | 0 | 0 |
|  | Castor oil-based polyol 3 (parts by weight) | 0 | 0 | 0 | 0 | 0 | 0 | 0 | 0 | 0 |
|  | Polyether-based polyol A (parts by weight) | 78 | 56 | 0 | 0 | 0 | 0 | 0 | 56 | 56 |
|  | Polyether-based polyol B (parts by weight) | 0 | 0 | 56 | 36 | 22 | 56 | 0 | 0 | 0 |
|  | Polyether-based polyol C (parts by weight) | 0 | 0 | 0 | 0 | 0 | 0 | 56 | 0 | 0 |
|  | Polyester-based polyol (parts by weight) | 0 | 0 | 0 | 0 | 56 | 0 | 0 | 0 | 0 |
|  | Polycarbonate-based polyol 1 (parts by weight) | 0 | 0 | 0 | 0 | 0 | 0 | 0 | 0 | 0 |
|  | Polycarbonate-based polyol 2 (parts by weight) | 0 | 0 | 0 | 0 | 0 | 0 | 0 | 0 | 0 |
|  | Crosslinking agent (parts by weight) | 11 | 11 | 11 | 11 | 11 | 11 | 11 | 11 | 11 |
|  | Metal catalyst (parts by weight) | 0.1 | 0.1 | 0.1 | 0.1 | 0.1 | 0.1 | 0.1 | 0.1 | 0.1 |
|  | Foam stabilizer (parts by weight) | 5 | 5 | 5 | 5 | 5 | 5 | 5 | 5 | 5 |
|  | Metal hydroxide (parts by weight) | 20 | 20 | 20 | 20 | 20 | 20 | 20 | 20 | 20 |
|  | Water (parts by weight) | 0 | 0 | 0 | 0 | 0 | 0 | 0 | 0 | 0.44 |
|  | Mixing proportion of foam-forming gas (nitrogen) (vol %) | 31 | 77 | 77 | 77 | 77 | 77 | 77 | 69 | 91 |
|  | Isocyanate index | 104 | 104 | 104 | 104 | 104 | 104 | 104 | 104 | 104 |
| Evaluation result | Thickness of polyurethane foam (mm) | 0.1 | 1.5 | 1.5 | 1.5 | 1.5 | 1.5 | 1.5 | 1.5 | 1.5 |
|  | Apparent density (kg/m$^3$) | 700 | 240 | 240 | 240 | 240 | 240 | 240 | 320 | 100 |
|  | 25% compressive load (MPa) | 0.38 | 0.05 | 0.04 | 0.07 | 0.32 | 0.05 | 0.05 | 0.07 | 0.01 |
|  | Compressive residual strain (%) 80° C. | 1.0 | 1.2 | 0.7 | 0.5 | 2.5 | 0.8 | 1.5 | 1.5 | 1.5 |
|  | 100° C. | 7.0 | 7.2 | 3.0 | 1.5 | 6.0 | 3.0 | 7.0 | 6.5 | 9.0 |
|  | 110° C. | 14.5 | 15.0 | 4.0 | 2.0 | 14.0 | 4.5 | 13.0 | 13.5 | 17.0 |
|  | Dust resistance test | ○ | ○ | ○ | ○ | ○ | ○ | ○ | ○ | ○ |
|  | Average cell diameter (μm) | 50 | 150 | 150 | 150 | 150 | 150 | 150 | 100 | 200 |
|  | Comprehensive evaluation | ○ | ○ | ○ | ○ | ○ | ○ | ○ | ○ | ○ |

TABLE 2

|  |  | Example | | | | | |
|---|---|---|---|---|---|---|---|
|  | Foaming method | 10 | 11 | 12 | 13 | 14 | 15 |
|  |  | | | Mechanical froth method | | | |
| Polyurethane raw material | Castor oil-based polyol 1 (parts by weight) | 44 | 22 | 22 | 22 | 22 | 78 |
|  | Castor oil-based polyol 2 (parts by weight) | 0 | 0 | 0 | 0 | 0 | 0 |
|  | Castor oil-based polyol 3 (parts by weight) | 0 | 0 | 0 | 0 | 0 | 0 |
|  | Polyether-based polyol A (parts by weight) | 56 | 56 | 56 | 28 | 56 | 22 |
|  | Polyether-based polyol B (parts by weight) | 0 | 0 | 0 | 28 | 0 | 0 |
|  | Polyether-based polyol C (parts by weight) | 0 | 0 | 0 | 0 | 0 | 0 |
|  | Polyester-based polyol (parts by weight) | 0 | 0 | 0 | 0 | 0 | 0 |
|  | Polycarbonate-based polyol 1 (parts by weight) | 0 | 22 | 22 | 22 | 22 | 0 |
|  | Polycarbonate-based polyol 2 (parts by weight) | 0 | 0 | 0 | 0 | 0 | 0 |
|  | Crosslinking agent (parts by weight) | 11 | 11 | 11 | 11 | 11 | 11 |
|  | Metal catalyst (parts by weight) | 0.1 | 0.1 | 0.1 | 0.1 | 0.1 | 0.1 |
|  | Foam stabilizer (parts by weight) | 5 | 5 | 5 | 5 | 5 | 5 |

TABLE 2-continued

|  |  | Example | | | | | |
|---|---|---|---|---|---|---|---|
|  |  | 10 | 11 | 12 | 13 | 14 | 15 |
|  | Foaming method | Mechanical froth method | | | | | |
|  | Metal hydroxide (parts by weight) | 20 | 20 | 20 | 20 | 20 | 20 |
|  | Water (parts by weight) | 0 | 0.44 | 0 | 0 | 0 | 0 |
|  | Mixing proportion of foam-forming gas (nitrogen) (vol %) | 77 | 91 | 69 | 69 | 77 | 91 |
|  | Isocyanate index | 104 | 104 | 104 | 104 | 104 | 104 |
| Evaluation result | Thickness of polyurethane foam (mm) | 1.5 | 1.5 | 1.5 | 1.5 | 2 | 2 |
|  | Apparent density (kg/m$^3$) | 240 | 100 | 320 | 320 | 240 | 100 |
|  | 25% compressive load (MPa) | 0.05 | 0.02 | 0.09 | 0.08 | 0.06 | 0.03 |
|  | Compressive residual strain (%) 80° C. | 1.8 | 2.0 | 1.5 | 1.5 | 1.5 | 1.7 |
|  | 100° C. | 7.0 | 7.8 | 6.3 | 3.0 | 8.0 | 6.5 |
|  | 110° C. | 15.0 | 16.5 | 14.0 | 7.0 | 15.0 | 17.0 |
|  | Dust resistance test | ○ | ○ | ○ | ○ | ○ | ○ |
|  | Average cell diameter (μm) | 50 | 200 | 100 | 100 | 150 | 200 |
|  | Comprehensive evaluation | ○ | ○ | ○ | ○ | ○ | ○ |

TABLE 3

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
|  | Foaming method | Mechanical froth method | | | | | | | Chemical foaming method | | |
| Polyurethane raw material | Castor oil-based polyol 1 (parts by weight) | 0 | 17 | 0 | 0 | 83 | 22 | 22 | 22 | 22 | 22 |
|  | Castor oil-based polyol 2 (parts by weight) | 0 | 0 | 0 | 0 | 0 | 0 | 0 | 0 | 0 | 0 |
|  | Castor oil-based polyol 3 (parts by weight) | 0 | 0 | 44 | 0 | 0 | 0 | 0 | 0 | 0 | 0 |
|  | Polyether-based polyol A (parts by weight) | 100 | 83 | 56 | 56 | 17 | 56 | 56 | 0 | 56 | 56 |
|  | Polyether-based polyol B (parts by weight) | 0 | 0 | 0 | 0 | 0 | 0 | 0 | 22 | 0 | 0 |
|  | Polyether-based polyol C (parts by weight) | 0 | 0 | 0 | 0 | 0 | 0 | 0 | 0 | 0 | 0 |
|  | Polyester-based polyol (parts by weight) | 0 | 0 | 0 | 0 | 0 | 0 | 0 | 56 | 0 | 0 |
|  | Polycarbonate-based polyol 1 (parts by weight) | 0 | 0 | 0 | 0 | 0 | 22 | 22 | 0 | 22 | 22 |
|  | Polycarbonate-based polyol 2 (parts by weight) | 0 | 0 | 0 | 44 | 0 | 0 | 0 | 0 | 0 | 0 |
|  | Crosslinking agent (parts by weight) | 11 | 11 | 11 | 11 | 11 | 11 | 11 | 11 | 11 | 11 |
|  | Metal catalyst (parts by weight) | 0.1 | 0.1 | 0.1 | 0.1 | 0.1 | 0.1 | 0.1 | 0.1 | 0.1 | 0.1 |
|  | Foam stabilizer (parts by weight) | 5 | 5 | 5 | 5 | 5 | 5 | 5 | 5 | 5 | 5 |
|  | Metal hydroxide (parts by weight) | 20 | 20 | 20 | 20 | 20 | 20 | 20 | 20 | 20 | 20 |
|  | Water (parts by weight) | 0 | 0 | 0 | 0 | 0 | 0.89 | 0 | 0.56 | 2.8 | 0.56 |
|  | Mixing proportion of foam-forming gas (nitrogen) (vol %) | 69 | 69 | 69 | 69 | 69 | 96 | 26 | 0 | 0 | 0 |
|  | Isocyanate index | 104 | 104 | 104 | 104 | 104 | 104 | 104 | 104 | 104 | 104 |
| Evaluation result | Thickness of polyurethane foam (mm) | 1.5 | 1.5 | 1.5 | 1.5 | 1.5 | 1.5 | 0.1 | 1.5 | 1.5 | 1.5 |
|  | Apparent density (kg/m$^3$) | 320 | 320 | 320 | 320 | 320 | 50 | 750 | 240 | 50 | 240 |
|  | 25% compressive load (MPa) | 0.07 | 0.05 | 0.05 | 0.06 | 0.18 | 0.01 | 0.42 | 0.35 | 0.02 | 0.08 |
|  | Compressive residual strain 80° C. | 1.5 | 1.0 | 1.0 | 13.5 | 1.5 | 1.0 | 2.3 | 5.0 | 8.5 | 6.5 |
|  | (%) 100° C. | 21.5 | 20.5 | 12.0 | 27.8 | 4.0 | 4.3 | 5.5 | 13.0 | 10.5 | 12.0 |
|  | 110° C. | 24.5 | 22.0 | 18.0 | 31.2 | 4.7 | 7.7 | 8.5 | 19.0 | 16.0 | 18.0 |
|  | Dust resistance test | ○ | ○ | X | X | X | X | X | X | X | X |
|  | Average cell diameter (μm) | 100 | 100 | 100 | 100 | 100 | 350 | 50 | 350 | 450 | 350 |
|  | Comprehensive evaluation | X | X | X | X | X | X | X | X | X | X |

Thus, the polyurethane foams of Examples 1 to 15 and Comparative Examples 1 to 10 were obtained. Thickness, apparent density, 25% compressive load, compressive residual strain, dust resistance and average cell diameter of those polyurethane foams were measured. Measurement methods of 25% compressive load, compressive residual strain and dust resistance are described in detail below. Measurement results are shown in Tables 1 to 3. The comprehensive evaluation was that when compressive residual strain (100° C.) is 20% or less and dust resistance test result is ○, it is defined as ○ (passed). It says that sealing property is good as compressive residual strain is small and dust resistance is high.

The 25% compressive load is compressive stress when a sample having a diameter of 50 mm is subjected to 25% compression in a rate of 1 mm/min under the test conditions of JIS K6254: 1993.

The compressive residual strain was obtained by subjecting a sample to 50% compression in a thickness direction under the test conditions of JIS K6400-4: 2004 Method A (70° C.), allowing the sample to stand at a given temperature (each temperature of 80° C., 100° C. and 110° C.) for 22 hours, releasing compressive stress at ordinary temperature, measuring a thickness of the sample after 30 minutes, and calculating by the following formula.

Compressive residual strain (%)=[(thickness before compression−thickness after releasing)/thickness before compression]×100

The dust resistance test is conducted as follows. (A) of FIG. 4 is a side view showing the state when using a plate-like jig used in a dust resistance test, and (B) is a plain view thereof. FIG. 5 is a perspective view of a cylindrical container used in a dust resistance test.

Sample S formed into a frame shape having an outer frame dimension of 50 mm square, an inner frame dimension of 45 mm square and a frame width of 2.5 mm as shown in (B) of FIG. 4 is sandwiched between two plate-like jigs 51 and 52 shown in (A) of FIG. 4, and set so as to be subjected to 25% compression in a thickness direction of Sample S. One surface of Sample S is bonded to one plate-like jig 51 by a non-woven fabric substrate acrylic double-sided adhesive tape 57 having a thickness of 160 Spring 53 was provided between the plate-like jigs 51 and 52, and the plate-like jigs 51 and 52 were fastened with a bolt 54 and a nut 55.

The plate-like jigs 51 and 52 having Sample S set therebetween is placed in a cylindrical container 61 having an inner diameter of 250 mm and a length in a direction of an axial 63 of 340 mm together with 1 kg of a powder. The powder is talc powder having a particle diameter of from 4 to 10 μm. The cylindrical container 61 is rotated around the axis 63 at 60 rpm for 10 minutes. Whether or not the powder enters the inside of Sample S taken out from the cylindrical container 61 is visually confirmed. When it is confirmed that the powder is not present in the inside of Sample S, it was evaluated as ◯, and when it is confirmed that the powder is present in the inside of Sample S, it was evaluated as x.

As shown in the measurement results of Tables 1 and 2, Examples 1 to 15 all show good heat resistance that compressive residual strain at 80° C., 100° C. and 110° C. is 20% or less. Furthermore, Examples 3, 4 and 6 in which polyether polyol B (EO ratio: 70 mol %) having the proportion of oxythylene unit (EO ratio) in polyoxyalkylene of 50 mol % or more is used as polyether-based polyol and additionally the total amount of the polyether polyol having the EO ratio of 50 mol % or more and the castor oil-based polyol is from 50 to 100 parts by weight per 100 parts by weight of the polyol are that each compressive residual strain at 80° C., 100° C. and 110° C. is small as compared with other Examples, and heat resistance is very high. Furthermore, Examples 3, 4 and 6 are that because castor oil-based polyol is contained in an amount of from 40 to 70 parts by weight per 100 parts by weight of the polyol and the polyether-based polyol having the ethylene oxide ratio of 50 mol % or more is contained in an amount of from 30 to 60 parts by weight per 100 parts by weight of the polyol, heat resistance is very high.

On the other hand, Comparative Examples 1 and 2 are that because the amount of the castor oil-based polyol added is 0 or very small, the compressive residual strain is 20% or less at 80° C., but exceeds 20% at 100° C. and 110° C., and heat resistance is low.

Comparative Example 3 is that because the viscosity of the castor oil-based polyol is high, voids are generated when producing a polyurethane foam, and dust resistance is deteriorated.

Comparative Example 4 is that because castor oil-based polyol is not contained, viscosity of polycarbonate-based polyol that is other polyol is very high, and mixing by stirring becomes insufficient, heat resistance is decreased and dust resistance is deteriorated.

Comparative Example 5 is that because the amount of the castor oil-based polyol added is large, the viscosity of the polyurethane raw material is increased, and voids are generated when producing a polyurethane foam, and dust resistance is deteriorated.

Comparative Example 6 is that because the apparent density of a polyurethane foam is too low, hardness is decreased, cells become coarse, and dust resistance is deteriorated.

Comparative Example 7 is that because the apparent density of a polyurethane foam is too high, hardness is increased, adhesiveness when compressing is impaired, and dust resistance is deteriorated.

Comparative Examples 8 to 10 are that because not a mechanical froth method, a chemical foaming method is used, cells become coarse, and dust resistance is deteriorated.

The polyurethane foam of Example 3 using the castor oil-based polyol, the polyurethane foam of Comparative Example 1 that does not use castor oil-based polyol, the polyurethane foam of Comparative Example 11 in which the amount of the polyether polyol added is less than 20 parts by weight, a silicone foam and a rubber sponge were allowed to stand in the environment of 120° C. or in the environment of 70° C. and humidity 95% RH for a given period of time, and each compressive residual strain (50% compression, 100° C.×22 hours) was then measured. Comparative Example 11 is that in the formulation of Example 4, the amount of the polyether polyol B added was changed from 22 parts by weight to 18 parts by weight, and the amount of the polyester polyol added was changed from 56 parts by weight to 60 parts by weight. Other than those, the polyurethane foam was prepared in the same manner as in Example 4.

Table 4 shows measurement results of compressive residual strain after allowing to stand in the environment of 120° C., and Table 5 shows measurement results of compressive residual strain after allowing to stand in the environment of 70° C. and humidity 95% RH. The "Time" in Tables 4 and 5 is exposure time in each environment.

TABLE 4

| Compressive residual strain at | Time (hr) | | | | |
|---|---|---|---|---|---|
| 120° C. (%) | 0 | 336 | 672 | 1008 | 1344 |
| PU foam using castor oil-based polyol (formulation: Example 3) | 3.0 | 5.9 | 5.1 | 6.4 | 5.7 |
| General PU foam (formulation: Comparative Example 1) | 30.0 | 32.0 | 33.5 | 37.0 | 39.5 |
| Small amount of ether polyol (formulation: Comparative Example 11) | 9.5 | 19.0 | 19.0 | 19.5 | 21.5 |
| Silicone foam | 4.0 | 4.5 | 4.5 | 4.5 | 5.0 |
| Rubber sponge | 42.0 | 45.9 | 47.0 | 47.5 | 48.0 |

TABLE 5

| Compressive residual strain at 75° C. and 95% RH (%) | Time (hr) | | | | |
|---|---|---|---|---|---|
| | 0 | 336 | 672 | 1008 | 1344 |
| PU foam using castor oil-based polyol (formulation: Example 3) | 3.0 | 4.4 | 4.7 | 5.0 | 4.4 |
| General PU foam (formulation: Comparative Example 1) | 30.0 | 33.7 | 35.6 | 38.9 | 42.0 |
| Small amount of ether polyol (formulation: Comparative Example 11) | 9.5 | 19.0 | 24.0 | 30.2 | 41.3 |
| Silicone foam | 4.0 | 5.2 | 5.8 | 5.8 | 5.8 |
| Rubber sponge | 42.0 | 44.8 | 46.5 | 47.0 | 49.0 |

As shown in Tables 4 and 5, the polyurethane foam of Example 3 using the castor oil-based polyol has compressive residual strain at high temperature smaller than that of the polyurethane of Comparative Example 1 that does not use the castor oil-based polyol or the rubber sponge. Furthermore, it was confirmed that the polyurethane foam using the castor oil-based polyol shows compressive residual strain at high temperature equivalent to that of a silicone foam.

Comparative Example 10 in which the amount of the polyether polyol added is less than 20 parts by weight shows compressive residual strain smaller than that of Comparative Example 1 using only the polyether-bases polyol without using the castor oil-based polyol. However, the compressive residual strain after allowing to stand at 75° C. and 95% RH for 672 hours or more is larger than 20%, and particularly, compressive residual strain in high humidity can not be sufficiently decreased.

Thus, the polyurethane foam of the present invention has small compressive residual strain even at high temperature, and therefore shows excellent sealing property even in high temperature environment. Therefore, the polyurethane foam of the present invention is preferred as a sealing material in a neighboring region of a heat source. Furthermore, the polyurethane foam of the present invention is inexpensive as compared with a silicone foam and has small compressive residual strain equivalent to that of a silicone foam in high temperature environment. Therefore, from the standpoint of heat resistance, the polyurethane foam of the present invention can be used in place of a silicone foam that had to be conventionally used as a sealing material for high temperature environment, and this makes it possible to reduce costs.

The polyurethane foam of the present invention is preferably used in the following applications.

<Buffer Material Between Battery Cells in Electric Vehicle>

Battery cells mounted in an electric vehicle undergo expansion and contraction when generating electric power and charging. For this reason, a constant space is provided between battery cells. The space is provided with a buffer material such that cells do not break when impact is applied to a battery, such as in the case of an accident. On the other hand, cell temperature in a battery is increased to a maximum of about 80° C. Therefore, the buffer material is required to have heat resistance to such a temperature or higher. Furthermore, the buffer material plays a role of a shock absorber. Therefore, a material having flexibility and low compressive residual strain property is required.

A material having those performances is generally a silicone foam, but the silicone foam is very expensive as compared with other foaming materials. The amount of a buffer material used in one vehicle is large. Therefore, for the reduction in costs of a battery, it is desired to switch into an inexpensive material. The polyurethane foam of the present invention is inexpensive as compared with a silicone foam, and has very small compressive residual strain at a temperature of from 80 to 110° C. Therefore, the polyurethane foam of the present invention can be preferably used as a buffer material between battery cells of electric vehicles.

<Buffer Material of Battery Pack in Electric Vehicle>

A buffer material of a battery pack mounted in an electric vehicle is required to have small compressive residual strain. The silicone foam has small compressive residual strain, but contains a large amount of low molecular siloxane. Silica is sometimes precipitated from a silicone foam due to the low molecular siloxane. Where a siloxane foam is used as a buffer material of a battery pack, contact points on an electronic substrate mounted in a battery pack is contaminated with the precipitation of silica, and electric characteristics are likely deteriorated. For this reason, a silicone foam is not suitable for a buffer material of a battery pack. Therefore, a urethane foam is generally used as a buffer material of a battery pack. However, a urethane foam has large compressive residual strain.

The polyurethane foam of the present invention contains very small amount of low molecular weight siloxane as compared with a silicone foam. Furthermore, the polyurethane foam has very small compressive residual strain than the conventional urethane foam. For this reason, when the polyurethane foam of the present invention is used as a buffer material of a battery pack of an electric vehicle, the buffer material has sufficient buffer properties due to small compressive residual strain, and additionally because silica is not precipitated, contact fault is difficult to occur. Therefore, the polyurethane foam of the present invention can be preferably used as a buffer material of a battery pack of an electric vehicle.

<Buffer Material of Solar Panel>

Because a solar panel is used outside, a buffer material used in the solar panel is required to have waterproof property, small compressive residual strain and small compressive residual strain even in high temperature environment. A material having those performances is generally only a silicone foam, but the silicone foam is very expensive as compared with other foamed materials.

However, the polyurethane foam of the present invention is inexpensive as compared with a silicone foam, has very small compressive residual strain at 80 to 110° C., and does not increase compressive residual strain even in high temperature environment. Furthermore, waterproof property is high. For this reason, the polyurethane foam of the present invention can be preferably used as a buffer material of a solar panel.

<Buffer Material of Medical Monitor>

Medical monitor is required to have higher brightness than a consumer monitor, and a temperature in a monitor reaches up to about 60° C. A urethane foam or a polyolefin foam is generally used as a buffer material between a liquid crystal glass and a frame of a chassis in a consumer monitor. However, the conventional urethane foam and polyolefin foam generally used do not have sufficient heat resistance, and a material having higher heat resistance and flexibility is desired.

The polyurethane foam of the present invention has very small compressive residual strain at 80 to 110° C. and further has flexibility that 25% compressive load is from 0.02 to 0.40 MPa. For this reason, the polyurethane foam of the present invention can be preferably used as a buffer material of a medical monitor.

The polyurethane foam of the present invention can further be preferably used as a sealing material between battery cells of an electric vehicle, a sealing material of a battery pack of an electric vehicle, a sealing material of a solar panel and a sealing material of a medical monitor, in addition to the above-described buffer material between battery cells of an electric vehicle, buffer material of a battery pack of an electric vehicle, buffer material of a solar panel and buffer material of a medical monitor.

Although the present invention has been described in detail and by reference to the specific embodiments, it is apparent to one skilled in the art that various modifications or changes can be made without departing the spirit and scope of the present invention.

This application is based on Japanese Patent Application No. 2011-161650 filed Jul. 25, 2011, the disclosure of which is incorporated herein by reference.

INDUSTRIAL APPLICABILITY

According to the polyurethane foam of the present invention, because compressive residual strain at 100° C. is 20% or less, compressive residual strain at 100° C. is small. Therefore, the present invention can provide a polyurethane foam preferred as a sealing material in a neighboring region of a heat source.

EXPLANATIONS OF REFERENCE SIGNS

1 Polyurethane foam
10 Production apparatus
14 Substrate
20 Laminate
31 Mixing part
33 Feed roll
34 Product recovery roll
35 Discharge nozzle
36 Thickness control means
38 Heating means
M Polyurethane raw material

The invention claimed is:

1. A polyurethane foam obtained from a polyurethane raw material containing polyol, isocyanate, a foam stabilizer, a catalyst and a foam-forming gas by a mechanical froth method, wherein the polyol contains a castor oil-based polyol having a viscosity at 25° C. of 2,000 mPa·s or less, and a polyether-based polyol, the castor oil-based polyol is contained in an amount of from 20 to 80 parts by weight per 100 parts by weight of the polyol, the polyether-based polyol is contained in an amount of from 20 to 80 parts by weight per 100 parts by weight of the polyol, the polyurethane foam has an apparent density of from 100 to 700 kg/m$^3$, and compressive residual strain at 100° C. of 20% or less, the polyol contains the polyether-based polyol in which an ethylene oxide ratio that is a proportion of an oxyethylene unit in polyoxyalkylene is 50 mol % or more, in an amount of from 20 to 80 parts by weight per 100 parts by weight of the polyol, the total amount of the polyether-based polyol in which the ethylene oxide ratio is 50 mol % or more, and the castor oil-based polyol is from 50 to 100 parts by weight per 100 parts by weight of the polyol, and the polyurethane foam has an average cell diameter of from 50 to 300 μm.

2. The polyurethane foam according to claim 1, wherein the castor oil-based polyol is contained in an amount of from 40 to 70 parts by weight per 100 parts by weight of the polyol, and the polyether-based polyol in which the ethylene oxide ratio is 50 mol % or more is contained in an amount of from 30 to 60 parts by weight per 100 parts by weight of the polyol.

3. The polyurethane foam according to claim 1, which has a thickness of from 0.1 to 15 mm.

4. The polyurethane foam according to claim 1, which has 25% compressive load of from 0.02 to 0.40 MPa.

5. The polyurethane foam according to claim 1, which has compressive residual strain at 100° C. of 10% or less.

6. The polyurethane foam according to claim 1, which has compressive residual strain at 110° C. of 10% or less.

7. A sealing material, comprising:
the polyurethane foam according to claim 1.

8. A buffer material, comprising:
the polyurethane foam according to claim 1.

* * * * *